257/102

United States Patent Office 2,739,882

Patented Mar. 27, 1956

2,739,882

SURFACE TREATMENT OF GERMANIUM

Ray C. Ellis, Jr., Allston, Mass., assignor to Raytheon Manufacturing Company, Waltham, Mass., a corporation of Delaware No Drawing. Application February 25, 1954, Serial No. 412,628

3 Claims. (Cl. 41—42)

This invention relates to the surface treatment of semi-conductor materials and more particularly to chemical etchants as applied to germanium surfaces to improve the electrical characteristics thereof and to simplify the recovery of germanium from the etching solutions.

In preparing germanium for use in rectifiers, transistors, phototransistors and the like, the electrical characteristics of the final device are determined to a large degree by the surface condition of the germanium component utilized therein. It is well known that various combinations of chemical etching reagents can be used to clean the surface areas and remove lattice distortions from bodies of germanium. However, these etching solutions commonly contain an oxidizing agent and hydrofluoric acid or a fluoride in some form, and the resulting reaction in such an etching solution leaves that portion of the germanium which has been chemically removed from the principal germanium body in a tightly bound compound. Furthermore, special plastic containers, such as polyethylene containers, are needed to hold the fluoride etchants, and these solutions are relatively expensive. The value of germanium and the quantities used in the mass production of the above-mentioned devices make it quite important to recover germanium readily and economically from the etching solution. When fluoride etching solutions are employed, these recovery operations are quite involved. The invention herein described pertains to new etching solutions for germanium whereby the ease in handling the solution is facilitated, the cost of the solution is lowered, and the recovery of germanium is greatly simplified.

In the commercial manufacture of transistors, for example, germanium single crystals can be grown by the so-called seed-pulling method, and, by properly employing doping techniques to introduce certain impurities into the germanium melt, these single crystals can be made n-type or p-type, or they can contain junctions of the n-p or n-p-n type. In all cases, it is then necessary to cut the crystal into shapes suitable for device fabrication. The most common method employed to cut a crystal of germanium involves sawing the crystal into small dice or chips with a diamond impregnated metal wheel. To remove any superficial layer of disturbed material left on these chips by the mechanical preparation thereof, specific solutions suitable for etching germanium surfaces at predetermined rates are employed. As mentioned above, the known etches for germanium have in common a surface oxidant and a complexing agent hydrofluoric acid, which dissolves the oxide as it is formed. As previously noted, it is necessary to use special containers to hold these fluoride etching solutions, and they are expensive as compared to the novel etching solutions described below.

This invention involves the use of a sequestering agent in combination with a compatible oxidizing agent to etch germanium at a measurable controlled rate. As an example of a specific embodiment of this invention wherein one of a number of sequestering agents can be used in combination with hydrogen peroxide, for example, one part ethylenediamine tetraacetic acid by volume to two parts hydrogen peroxide by volume has been used successfully to etch germanium at a rate of 1.3 mils per hour. By increasing or decreasing the temperature and the concentration of either the sequestering agent or the oxidizing agent employed in the etching solution, the rate at which germanium can be etched may be varied as desired.

Another example of how the sequestering agents can be used to etch germanium involves a fluid mixture of one of the sodium salts of ethylenediamine tetraacetic acid; for example, the tetrasodium salt has been used successfully, in combination with a compatibile oxidizing agent, such as hydrogen peroxide. It should be noted that the tri-sodium, di-sodium or mono-sodium salts of this particular sequestering agent could be used as well and that the invention disclosed herein should in no way be limited to the particular examples described above. In the case of each of the many possible combinations of these etching solutions, the recovery of germanium is greatly simplified. Furthermore, the etching solutions can be handled with greater safety and the containers employed in their use can be made of glass, for example, rather than the plastic materials required when hydrofluoric acid etches are used. The cost of the novel etching solutions described above is relatively low and additional control agents are not needed to regulate the speed at which germanium is removed from the chip.

However, this invention should not be limited to the particular details described above as many equivalents will suggest themselves to those skilled in the art. The sequestering agents encompass a broad group of well-known compounds of which only a few have been discussed above. It has been determined that all of the sequestering agents are highly suitable for etching germanium at a measurable controlled rate. Therefore, it is desired that the appended claims be given a broad interpretation commensurate with the scope of the invention within the art.

What is claimed is:

1. The method of improving the electrical characteristics of a germanium body comprising etching the surface of said body with a solution from which excess germanium is readily reclaimable, said solution comprising a fluid mixture comprising a sequestering agent selected from the group consisting of ethylenediamine tetra-acetic acid, the tetra-sodium salt of said acid, the tri-sodium salt of said acid, the di-sodium salt of said acid and the mono-sodium salt of said acid, and a compatible oxidizing agent, and then washing said fluid mixture from said surface.

2. The method of improving the electrical characteristics of a germanium body comprising etching the surface of said body with a solution from which excess germanium is readily reclaimable, said solution comprising a fluid mixture of ethylenediamine tetra-acetic acid and hydrogen peroxide, and then washing said fluid mixture from said surface.

3. The method of improving the electrical characteristics of a germanium body comprising etching the surface of said body with a solution from which excess germanium is readily reclaimable, said solution comprising a fluid mixture of the tetra-sodium salt of ethylenediamine tetra-acetic acid and hydrogen peroxide, and then washing said fluid mixture from said surface.

References Cited in the file of this patent

UNITED STATES PATENTS 2,577,803 Pfann ---------------- Dec. 11, 1951

OTHER REFERENCES

Versenes Technical Bulletin No. 2, published by the Bersworth Chemical Co., Framingham, Mass. (sec. II, pages 16 and 46 to 48).